H. A. CRANDELL.
WIRE STRETCHING DEVICE.
APPLICATION FILED DEC. 1, 1911.
1,050,429.
Patented Jan. 14, 1913.
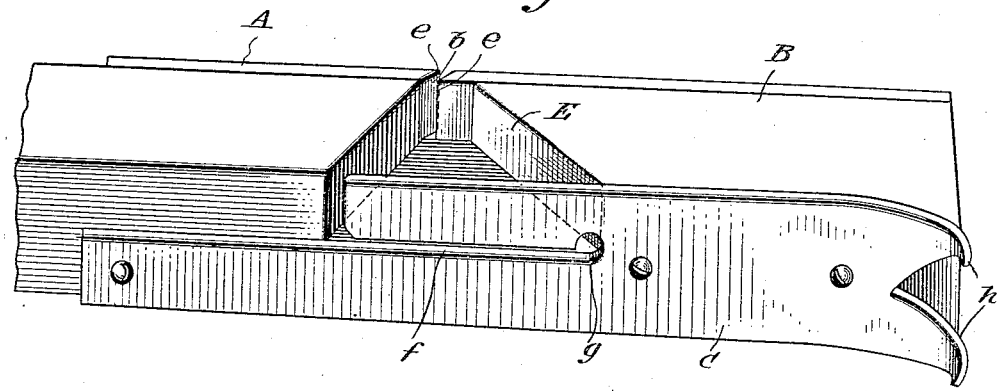
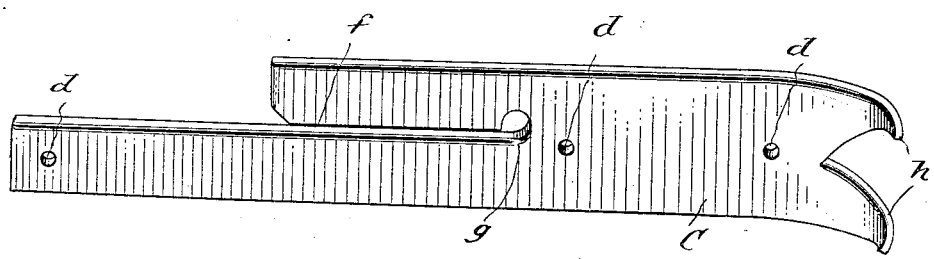
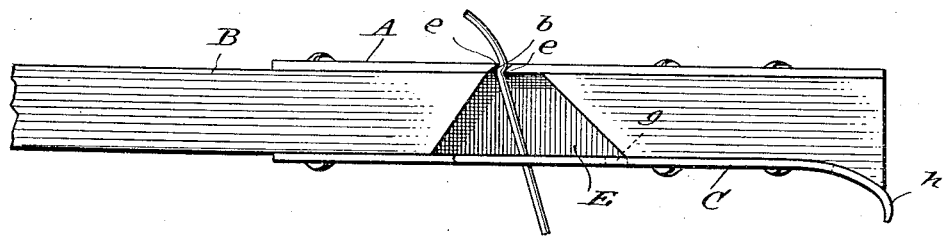
Witnesses:
William F. Mitchell
U. J. James
Inventor,
Henry A. Crandell.

UNITED STATES PATENT OFFICE.

HENRY A. CRANDELL, OF HARRISON, ARKANSAS.

WIRE-STRETCHING DEVICE.

1,050,429. Specification of Letters Patent. Patented Jan. 14, 1913.

Application filed December 1, 1911. Serial No. 663,471.

*To all whom it may concern:*

Be it known that I, HENRY A. CRANDELL, a citizen of the United States, residing at Harrison, in the county of Boone and State of Arkansas, have invented a new and useful Wire-Stretching Device, of which the following is a specification.

My invention relates to improvements in a wire-stretching device in which a grooved metal plate, and a slotted metal plate provided with a claw, act in conjunction with a recessed lever, bolted to and between said plates; and the objects of my improvements are, first, to provide a secure grip and hold upon a wire at the resistant or pulling point in said lever; second, to provide a secure hold upon the post or object to which the wire is to be fastened at the sustaining point; third, to provide a central draft upon said lever; and fourth to control a wire while it is being stretched. I attain these objects by the mechanism illustrated in the accompanying drawings, in which—

Figure 1 is a perspective view of the device (the handle not shown in drawings should be of sufficient length to furnish a proper leverage); Fig. 2 is a view of metal plate C detached; Fig. 3, a top view of the device.

Similar letters refer to similar parts throughout the several views.

Metal plate A in Fig. 1 is provided with a diagonal groove $b$, cut through from one side, thereby forming the sharp edges $e, e$, cut to a depth sufficient to provide for a central draft thereon. This plate is attached to the back of lever B, Fig. 1, which shows a top view of the lever proper (preferably of wood) showing a triangular recess or chamber E. Recess E is to provide for the passage of a wire from groove $b$, in plate A, to slot $f$ and circular opening, $g$, in plate C. Said channel being of uniform depth throughout.

Fig. 2 shows plate C detached with oblong groove $f$, circular opening $g$, and claw $h$ with bolt holes at $d, d, d$.

Fig. 3 is a top view showing in detail the construction of the device not shown in Figs. 1 and 2, and also illustrates the action of the device upon a wire when in use. The wire being gripped in the groove $b$, passes through the chamber E in lever B to the slot $f$ and glides along the slot $f$ to circular opening $g$. The device being sustained, upon the object to which the wire is to be fastened, by means of claw $h$ (the handle of lever not being shown).

I claim:

1. A wire stretcher, consisting of a handle provided on one side with a transverse notch, plates secured to opposite sides of handle and closing the ends of said notch, one of the plates being provided with a transverse slot and the other having a longitudinal slot, the slot in each plate being opposite an end of the notch in the handle.

2. A wire-stretcher, consisting of a handle provided on one side with a tapering transverse notch, a gripping-plate secured to one side of the handle and closing the narrow end of the notch, said gripping-plate being provided with a transverse slot having parallel beveled walls, and a retaining-plate secured to the handle opposite the gripping-plate and closing the other end of the aforementioned notch, said plate being provided with a longitudinal slot enlarged at its inner end, said slot adapted to guide a wire held by the gripping-plate.

3. A wire-stretcher, consisting of a handle provided on one side with a transverse tapering notch, a gripping-plate secured to one side of the handle and closing the narrow end of said notch, said gripping-plate being provided with a transverse slot, the walls of which are parallel and beveled to provide gripping edges, a retaining-plate secured to the handle opposite the gripping-plate having a longitudinal slot enlarged at its inner end and extending across the end of the notch, said retaining-plate having the inner end portion at one side of the notch cut away and the edge of the remaining portion being spaced from one side of the notch, said longitudinal slot being adapted to guide a wire held by the transverse slot in the gripping-plate.

HENRY A. CRANDELL.

Witnesses:
W. F. MITCHELL,
R. C. HUEY.

Copies of this patent may be obtained for five cents each, by addressing the "Commissioner of Patents, Washington, D. C."